(12) United States Patent
Coleman

(10) Patent No.: US 7,451,243 B2
(45) Date of Patent: Nov. 11, 2008

(54) SYSTEM AND METHOD FOR IMPLEMENTING RMII ETHERNET RESET

(75) Inventor: Daryl A. Coleman, Plano, TX (US)

(73) Assignee: Alcatel Lucent, Paris (FR)

( * ) Notice: Subject to any disclaimer, the term of this patent is extended or adjusted under 35 U.S.C. 154(b) by 953 days.

(21) Appl. No.: 10/655,463

(22) Filed: Sep. 4, 2003

(65) Prior Publication Data

US 2005/0021753 A1    Jan. 27, 2005

Related U.S. Application Data

(60) Provisional application No. 60/466,279, filed on Apr. 29, 2003.

(51) Int. Cl.
G06F 3/00 (2006.01)
G06F 13/00 (2006.01)
G06F 15/173 (2006.01)

(52) U.S. Cl. .................. 710/10; 710/18; 710/104; 709/225

(58) Field of Classification Search ............. 710/10, 710/104, 18; 709/225
See application file for complete search history.

(56) References Cited

U.S. PATENT DOCUMENTS

| | | | |
|---|---|---|---|
| 4,761,807 A | 8/1988 | Matthews et al. | |
| 5,119,379 A * | 6/1992 | Dara | 714/46 |
| 5,784,573 A | 7/1998 | Szczepanek et al. | |
| 6,535,422 B2 * | 3/2003 | Goto et al. | 365/185.11 |
| 6,546,496 B1 | 4/2003 | Wang et al. | |
| 6,606,709 B1 * | 8/2003 | Connery et al. | 726/14 |
| 6,798,744 B1 * | 9/2004 | Loewen et al. | 370/235 |
| 6,950,391 B1 * | 9/2005 | Zadikian et al. | 370/219 |
| 7,035,586 B2 * | 4/2006 | Finet | 455/7 |
| 2004/0257997 A1 * | 12/2004 | Loewen et al. | 370/235 |
| 2006/0013240 A1 * | 1/2006 | Ma et al. | 370/401 |
| 2006/0150067 A1 * | 7/2006 | Kanasugi et al. | 714/795 |

FOREIGN PATENT DOCUMENTS

EP    1139611    10/2001

\* cited by examiner

*Primary Examiner*—Niketa I Patel

(57) ABSTRACT

System and method for implementing RMII Ethernet reset of a slave card is described. In one embodiment, the invention comprises a method of resetting a slave card electrically connected to an administrative processor of a system via a Reduced Media Independent Interface ("RMII") Ethernet physical layer device ("PHY"). The method comprises, responsive to detection of a start of frame indicator ("SFI"), activating a shift register; shifting reset signal data into the shift register; comparing the reset signal data shifted into the shift register with compare data; and responsive to the reset signal data being the same as the compare data, resetting the slave card.

25 Claims, 3 Drawing Sheets

SYSTEM AND METHOD FOR IMPLEMENTING RMII ETHERNET RESET

PRIORITY UNDER 35 U.S.C. §119(e) & 37 C.F.R. §1.78

This nonprovisional application claims priority based upon the following prior United States provisional patent application entitled: *RMII Ethernet Reset*, Application No. 60/466,279, filed Apr. 29, 2003, in the name of Daryl A. Coleman, which is hereby incorporated by reference for all purposes.

BACKGROUND OF THE INVENTION

1. Technical Field of the Invention

The present invention generally relates to Ethernet physical layer ("PHY") devices. More particularly, and not by way of any limitation, the present invention is directed to a system and method for providing a system reset via an RMII PHY device to cards distributed through a system.

2. Description of Related Art

Signaling servers ("SSs") are employed in telecommunications networks to handle various signaling functionalities such as, e.g., call control, session control, and radio recourse control. An SS handles routing and maintains the status of calls over the network. It takes the requests of user agents that want to connect to other user agents and routes these requests with the appropriate signaling.

At least one previous SS design was implemented using a proprietary bus interface. When a slave card, such as a link card, installed in a slot on a backplane of the SS needed to be reset, a system reset signal was transmitted from an administrative controller of the SS via the proprietary bus interface to reset the card. Such a system reset may be issued when a card needs to be booted and placed in service or when it needs to be taken out of service, for example. It is imperative that every card installed in every slot of every backplane of the SS is capable of being reset based on whatever communication connection exists between the administrative controller and the cards.

As previously mentioned, in a prior SS system, the communications connection was implemented with a proprietary interface. In contrast, in one embodiment of a current SS system, the communications connection is implemented using an Ethernet connection. Moreover, in this embodiment, the Ethernet controller employed requires a Reduced Media Independent Interface ("RMII") standard, rather than a Media Independent Interface ("MII") standard, for which a reset circuit has previously been developed and deployed. The main differences between the two interfaces is that in RMII, the clock speed is 50 MHz and the data width is 2 serial lines, while in MII, the clock speed is 25 MHz and the data width is 4 serial lines.

Therefore, what is needed is an RMII-based reset circuit for use in a SS employing an Ethernet controller using an RMII PHY for the communications connection between the administrative controller and the link cards installed therein.

SUMMARY OF THE INVENTION

In one embodiment, the invention comprises a method of resetting a slave card electrically connected to an administrative processor of a system via a Reduced Media Independent Interface ("RMII") Ethernet physical layer device ("PHY"). The method comprises, responsive to detection of a start of frame indicator ("SFI"), activating a shift register; shifting reset signal data into the shift register; comparing the reset signal data shifted into the shift register with compare data; and responsive to the reset signal data being the same as the compare data, resetting the slave card.

In another embodiment, the invention comprises a circuit for resetting a slave card installed in a system via an Ethernet Reduced Media Independent Interface ("RMII") physical layer device ("PHY"). The circuit comprises an enable circuit connected to receive a carrier sense signal from the RMII PHY; a shift register connected to the enable circuit, wherein responsive to receipt of the SFI, the enable circuit enables the shift register; and a comparator connected to the shift register; wherein when the shift register is enabled, reset signal data is shifted into the shift register; and wherein when the reset signal data is equal to compare data, the comparator outputs a reset signal to reset the slave card.

In another embodiment, the invention comprises a circuit for resetting a slave card electrically connected to an administrative processor of a system via a Reduced Media Independent Interface ("RMII") Ethernet physical layer device ("PHY"). The circuit comprises means responsive to detection of a start of frame indicator ("SFI") for activating a shift register; means for shifting reset signal data into the shift register; means for comparing the reset signal data shifted into the shift register with compare data; and means responsive to the reset signal data being the same as the compare data for resetting the slave card.

BRIEF DESCRIPTION OF THE DRAWINGS

A more complete understanding of the present invention may be had by reference to the following Detailed Description when taken in conjunction with the accompanying drawings wherein.

DETAILED DESCRIPTION OF THE DRAWINGS

Figure 1:
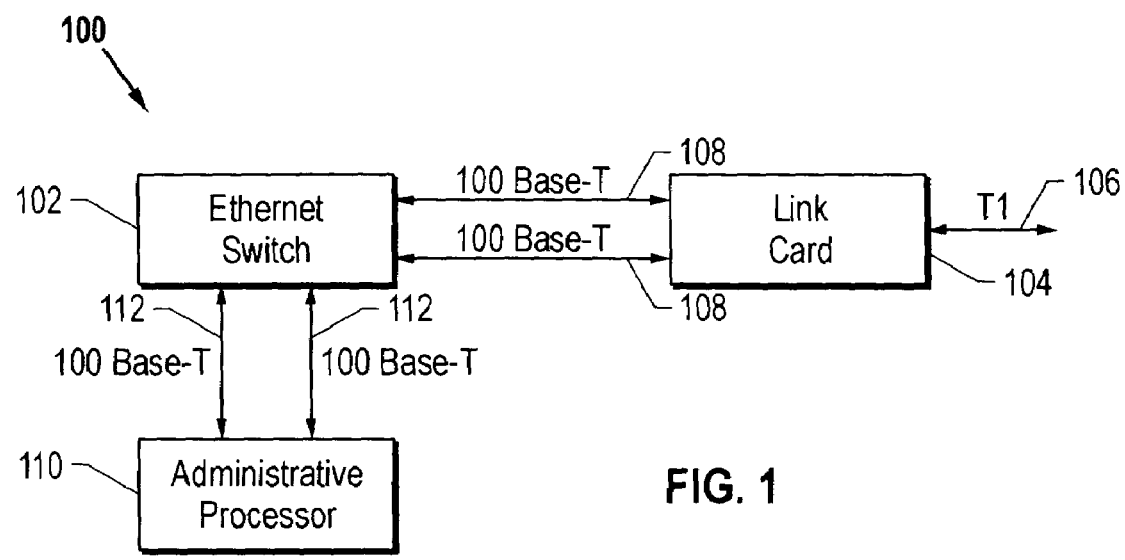
FIG. 1 illustrates a block diagram of a signaling server in accordance with one embodiment.

In the drawings, like or similar elements are designated with identical reference numerals throughout the several views thereof, and the various elements depicted are not necessarily drawn to scale.

FIG. 1 illustrates a block diagram of a signaling server ("SS") 100 in accordance with one embodiment. As illustrated in FIG. 1, the SS 100 includes an Ethernet switch 102 connected to each of a plurality of slave, or link, cards, represented in FIG. 1 by a link card 104, via a pair of 100 Base-T Ethernet lines 108. The link card 104 provides an interface to a corresponding T1 line 106 when it is inserted into a slot on a backplane (FIG. 2) of the SS 100.

The Ethernet switch 102 is also connected to an administrative processor 110 via a pair of 100 Base-T Ethernet lines 112. As previously suggested, when one of the link cards, such as the link card 104, needs to be reset, the administrative controller 110 generates a system reset signal. In a manner that will be described in greater detail below, the system reset signal is transmitted to the link cards via the Ethernet switch 102 to reset a selected one of the link cards (e.g., the link card 104).

Figure 2:
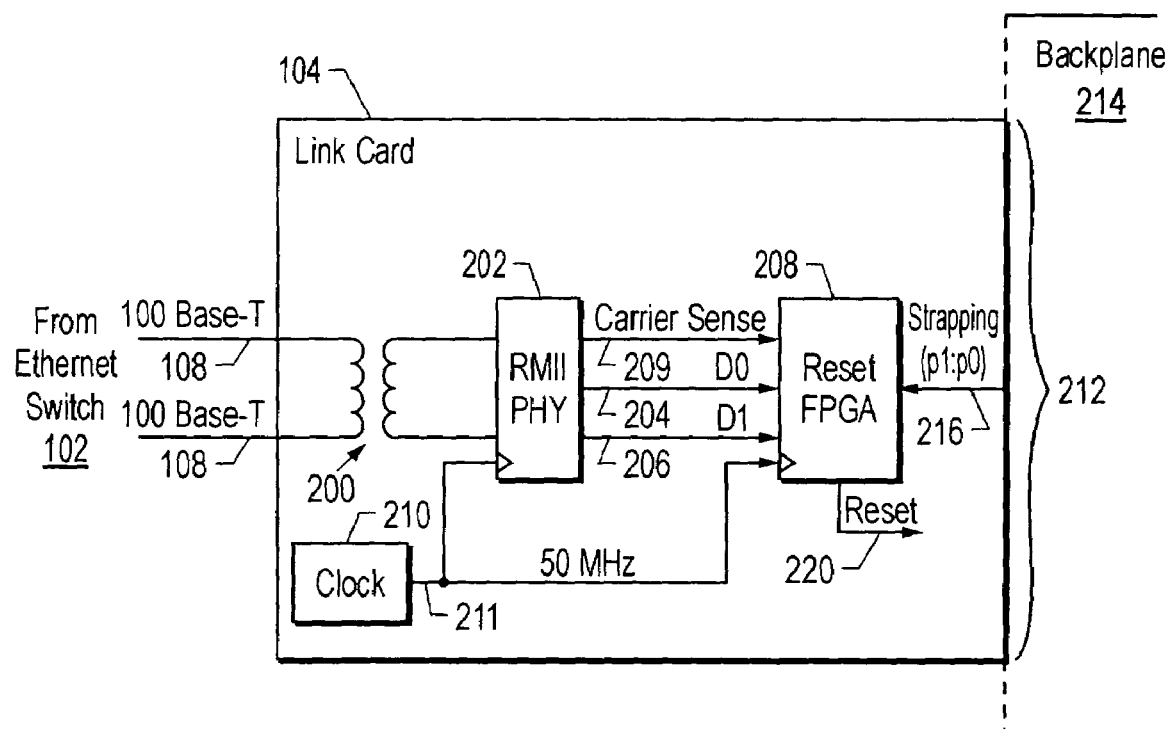
FIG. 2 illustrates a more detailed block diagram of one embodiment of a link card of the signaling server of FIG. 1.

FIG. 2 illustrates a more detailed block diagram of one embodiment of the link card 104. As shown in FIG. 2, the link card 104 includes a transformer 200 for electrically coupling an RMII Ethernet PHY 202 of the link card 104 with the Ethernet switch 102 via the 100 Base-T Ethernet lines 108. For purposes that will be described in greater detail below, data lines D0 and D1, respectively designated by reference numerals 204 and 206, are provided from the RMII PHY 202 to a reset circuit, which in the illustrated embodiment is implemented as a Field Programmable Gate Array ("FPGA"), 208. A line 209 is provided between the RMII PHY 202 and the FPGA 208 for providing a carrier sense signal to the FPGA to notify the FPGA that receipt of a valid frame from the Ethernet switch 102 has begun. The carrier sense line 209 is activated by the PHY 202 upon detection of Start of a stream delimiter, followed by an Ethernet preamble and Start of Frame indicator ("SFI"). Data is clocked out of the RMII PHY 202 and into the FPGA 208 via the data lines 204, 206, by a 50 MHz clock signal output from a clock 210 on a line 211.

As will be recognized by one of ordinary skill in the art, the link card 104 is installed in one of a plurality of slots, represented by a slot 212, on one of possibly more than one backplanes, represented by a backplane 214, of the SS 100. In one embodiment, the SS 100 includes one or more backplanes, each of which includes a plurality of slots for receiving a link card. A readable strapping, which identifies a backplane (e.g., backplane 214) and a slot (e.g., slot 212) of the identified backplane in which the link card 104 is installed is provided to the FPGA 208 via an address line 216 by the backplane 214. In one embodiment, the strapping comprises 16 bit (two bytes) of data comprising a ten-bit backplane strapping portion that identifies a location of the backplane and a six-bit slot strapping portion that identifies a slot location.

In one embodiment, a non-global, local, 48-bit (six-byte) Ethernet address is defined for use as a reset signal. In this embodiment, the address begins with a standard two-byte header value (48:C0) followed by two bytes of zeros. The remaining two bytes comprise a reset address, or strapping data, the first ten bits of which identify the backplane location, such as by a backplane ID number, and the remaining six bits of which identify the slot location, such as by a slot ID number. As will be described in greater detail below, when a system reset signal comprising a reset address that matches the strapping data provided to the FPGA 208 is received at the FPGA 208, the FPGA activates a reset line 220 to reset the link card 104.

Figure 3:
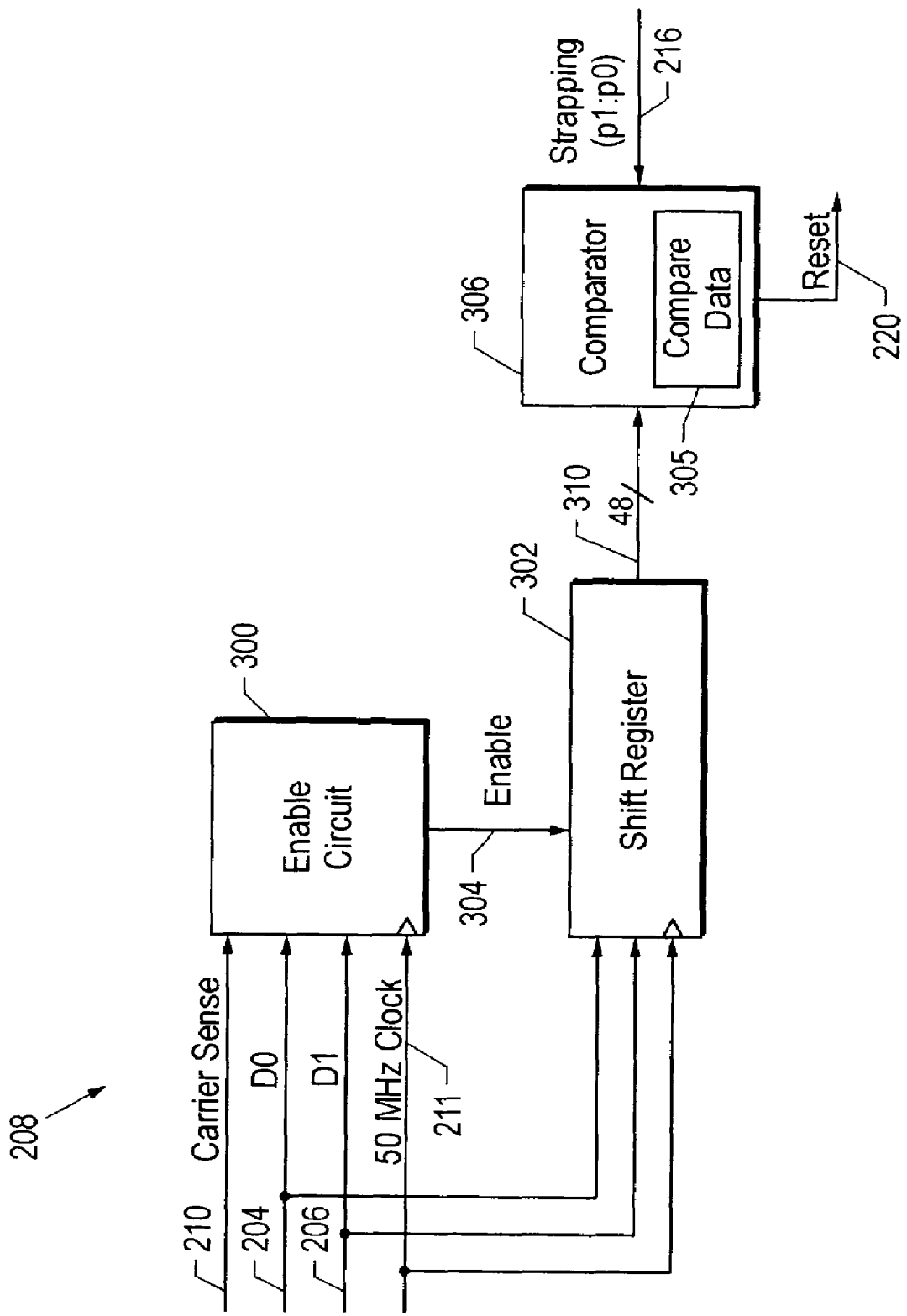
FIG. 3 illustrates a more detailed block diagram of one embodiment of a reset circuit of the link card of FIG. 2.

FIG. 3 is a more detailed block diagram of one embodiment of a the FPGA 208. As shown in FIG. 3, the FPGA 208 includes an enable circuit 300 which is connected to receive a carrier sense signal on the line 210 and data comprising the system reset signal on the lines 204, 206. The data is clocked into the enable circuit 300 using the 50 MHz clock signal from the clock 210 (FIG. 2). The primary function of the enable circuit 300 is to detect the carrier sense signal on line 210 and the preamble and SFI on D0/D1 (reference numerals 204/206) and, responsive to such detection, to enable a shift register 302 by activating an enable line 304.

Once the shift register 302 is enabled, the 48 bits of data on the lines 204, 206, comprising the system reset signal are shifted into the shift register. In one embodiment, the even bits (e.g., bit 0, bit 2, bit 4, etc.) of the system reset signal are shifted in via the line 204 and the odd bits (e.g., bit 1, bit 3, bit 5, etc.) of the system reset signal are shifted in on the line 206, thereby to accumulate the first, full 48 bits of the Ethernet header.

The value of the reset header, including the two bytes of zeros (42:C0:00:00) and the strapping data (p1:p0) provided to the FPGA 208 from the backplane 214 is stored as "compare data" in a memory device 305 of a comparator 306. The comparator 306 compares each bit of the 48 bits shifted out of the shift register 304 into the comparator on a line 310 with the compare data stored in the memory device 305. If the 48 bits of data input to the comparator 306 match the 48 bits of compare data stored therein, the comparator causes the link card 104 to be reset by activating a signal on the reset line 220.

Figure 4:
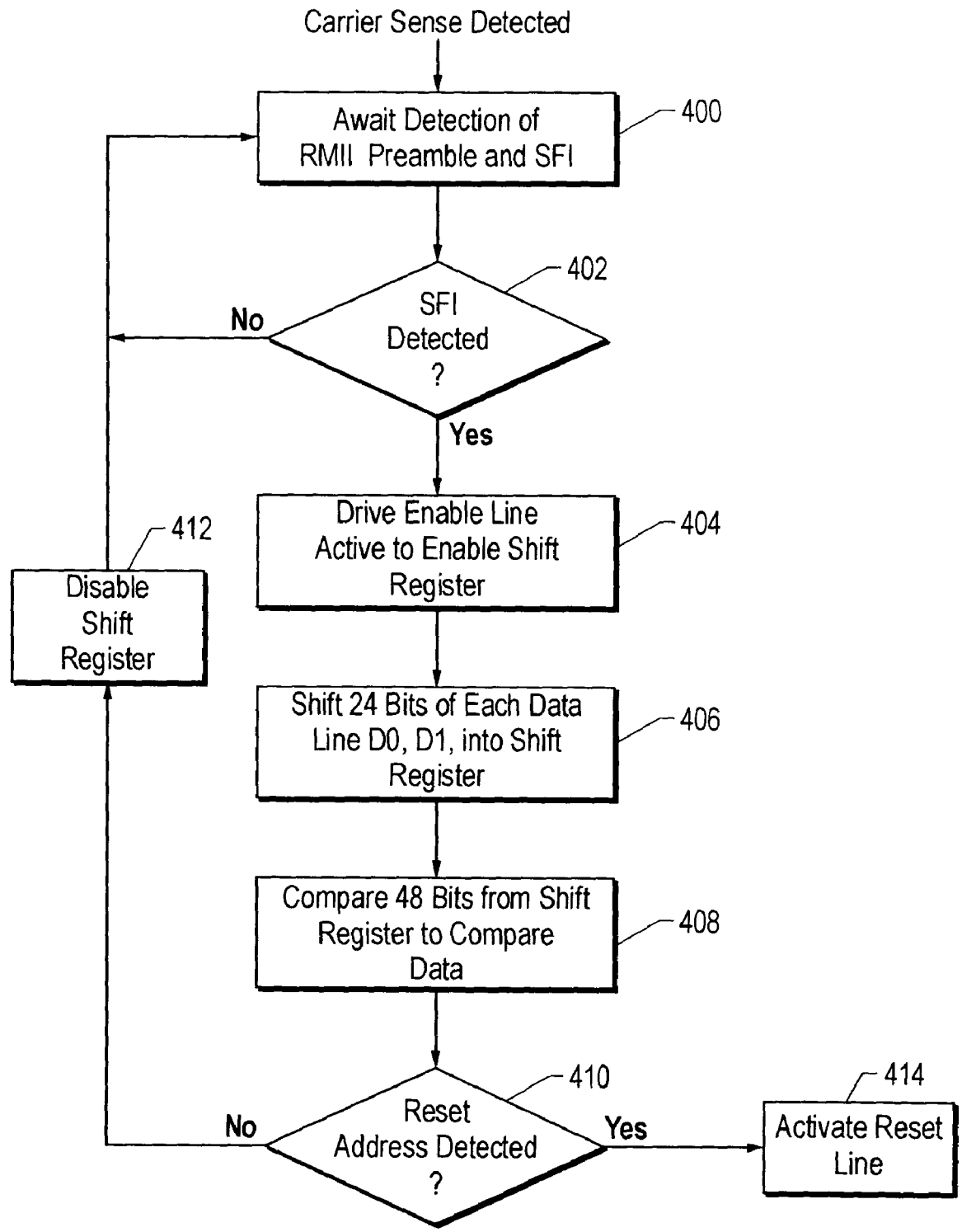
FIG. 4 illustrates a flowchart of the operation of the reset circuit of FIG. 3 in accordance with one embodiment.

FIG. 4 is a flowchart of the operation of one embodiment of the reset FPGA 208. In step 400, responsive to the RMII PHY 202 driving the carrier sense line 210 active, detection of the RMII preamble and SFI by the enable circuit 300 on the data lines 204, 206, is awaited. In step 402, a determination is made whether the RMII preamble and, in particular, the SFI, has been detected. If not, execution returns to step 400; otherwise, execution proceeds to step 404.

In step 404, the enable circuit 300 drives the enable line 304 active to enable the shift register. In step 406, 24 bits of each data line 204, 206, are shifted into the shift register 302. In step 408, the 48 bits shifted into the shift register 302 in step 406 are input to the comparator 306, which compares it with the compare data stored in the memory device 305. In step 410, a determination is made whether the data input to the comparator 306 matches the data stored therein. If not, the shift register 302 is disabled in step 412 and execution returns to step 400; otherwise, execution proceeds to step 414. In step 414, the reset line is activated to reset the link card 104.

Based upon the foregoing Detailed Description, it should be readily apparent that the present invention advantageously provides system and method for providing a system reset via an RMII PHY device to cards distributed through a system.

It is believed that the operation and construction of the present invention will be apparent from the foregoing Detailed Description. While the exemplary embodiments of the invention shown and described have been characterized as being preferred, it should be readily understood that various changes and modifications could be made therein without departing from the scope of the present invention as set forth in the following claims.

What is claimed is:

1. A method of resetting a slave card electrically connected to an administrative processor of a system via a Reduced Media Independent Interface ("RMII") Ethernet physical layer device ("PHY"), the method comprising:
responsive to detection of a start of frame indicator ("SFI"), activating a shift register;
shifting reset signal data into the shift register, wherein the reset signal data includes a reset address corresponding to a slave card to be reset;
comparing the reset signal data shifted into the shift register with compare data, wherein the compare data includes strapping data corresponding to the slave card; and
responsive to the reset signal data being the same as the compare data, resetting the slave card.

2. The method of claim 1 further comprising providing to the slave card the strapping data.

3. The method of claim 1 further comprising:
detecting a carrier sense signal; and
responsive to detection of the carrier sense signal, awaiting detection of the SFI.

4. The method of claim 3 further comprising, responsive to the reset signal data being different from the compare data:
disabling the shift register; and
awaiting detection of the carrier sense signal.

5. The method of claim 2 wherein the strapping data identifies a location of the slave card in the system.

6. The method of claim 1 wherein the reset signal data comprises a header portion identifying the data as a reset signal.

7. The method of claim 1 wherein the reset signal data including the reset address identifies a backplane and a slot of the backplane in which a slave card to be reset is installed.

8. The method of claim 1 further comprising defining a non-global, local, 48-bit Ethernet address for use as a reset signal.

9. The method of claim 8 wherein the Ethernet address comprises a standard two-byte header value followed by two bytes of zeros and the reset address corresponding to a slave card to be reset.

10. A circuit for resetting a slave card installed in a system via an Ethernet Reduced Media Independent Interface ("RMII") physical layer device ("PHY"), the circuit comprising:

an enable circuit connected to receive a carrier sense signal from the RMII PHY;

a shift register connected to the enable circuit, wherein responsive to receipt of the SFI, the enable circuit enables the shift register; and a comparator connected to the shift register, wherein when the shift register is enabled, reset signal data including a reset address corresponding to a slave card to be reset is shifted into the shift register, and further wherein when the reset signal data is equal to compare data including strapping data corresponding to the slave card, the comparator outputs a reset signal to reset the slave card.

11. The circuit of claim 1 wherein, when the reset signal data is not equal to the compare data, the shift register is disabled.

12. The circuit of claim 10 wherein the comparator further comprises a memory device for storing the compare data.

13. The circuit of claim 10 wherein the reset signal data is clocked into the shift register via two data lines.

14. The circuit of claim 13 wherein half of the reset signal data is clocked into the shift register via a first one of the data lines and the remainder of the reset signal data is clocked into the shift register via a second one of the data lines.

15. The circuit of claim 10 wherein the reset signal data comprises a non-global, local, 48-bit Ethernet address.

16. The circuit of claim 15 wherein the Ethernet address comprises a standard two-byte header value followed by two bytes of zeros and the reset address corresponding to a slave card to be reset.

17. A circuit for resetting a slave card electrically connected to an administrative processor of a system via a Reduced Media Independent Interface ("RMII") Ethernet physical layer device ("PHY"), the circuit comprising:

means responsive to detection of a start of frame indicator ("SFI") for activating a shift register;

means for shifting reset signal data into the shift register, wherein the reset signal data includes a reset address corresponding to a slave card to be reset;

means for comparing the reset signal data shifted into the shift register with compare data, wherein the compare data includes strapping data corresponding to the slave card; and means responsive to the reset signal data being the same as the compare data for resetting the slave card.

18. The circuit of claim 17 further comprising means for providing to the slave card the strapping data.

19. The circuit of claim 17 further comprising:
means for detecting a carrier sense signal; and
means responsive to detection of the carrier sense signal, awaiting detection of the SFI.

20. The circuit of claim 19 further comprising means responsive to the reset signal data being different from the compare data for disabling the shift register and awaiting detection of the carrier sense signal.

21. The circuit of claim 18 wherein the strapping data identifies a location of the slave card in the system.

22. The circuit of claim 17 wherein the reset signal data comprises a header portion identifying the data as a reset signal.

23. The circuit of claim 17 wherein the reset address corresponding to a slave card to be reset identifies a backplane and a slot of the backplane in which a slave card to be reset is installed.

24. The circuit of claim 17 further comprising means for defining a non-global, 48-bit Ethernet address for use as a reset signal.

25. The circuit of claim 24 wherein the Ethernet address comprises a standard two-byte header value followed by two bytes of zeros and the reset address corresponding to a slave card to be reset.

* * * * *